UNITED STATES PATENT OFFICE.

CHARLES HENRY KELSALL, OF HORWICH, ENGLAND.

MANUFACTURE OF HIGH-PER-CENT.-MANGANESE STEEL.

No. 873,556.      Specification of Letters Patent.      Patented Dec. 10, 1907.

Application filed March 4, 1907. Serial No. 360,563.

*To all whom it may concern:*

Be it known that I, CHARLES HENRY KELSALL, subject of England, residing at 613 Chorley New Road, Horwich, in the county of Lancaster, England, metallurgical chemist, have invented certain new and useful Improvements in or Relating to the Manufacture of High-Per-Cent.-Manganese Steel, of which the following is a specification.

This invention refers to improvements in or relates to the manufacture of high per cent. manganese steel, and has for its object that of adding a mild or low carbon steel which is overcharged with oxids—to molten rich ferro-manganese—80 to 82 percent. This I carry into effect in the following manner:—This steel is made either in a converter, open hearth acid or basic furnaces, or by other convenient or desired method. This steel must be low in carbon and silicon, and of a somewhat spongy or porous nature, the degree of sponginess or porousness being ruled or affected according to the percentage of manganese required in a resulting metal which shall at the same time be sound. The method of obtaining a steel (which as hereinbefore stated is a steel overcharged with oxids) is by adding an excessive quantity of oxid of iron in the form of iron ore of about one cwt. to a ton of steel in the furnace at a time when the percentage of carbon in the steel is low and thus enabling the degree of sponginess or porousness to be easily gaged by sampling from the furnace in the ordinary manner, and there not being enough carbon in the steel to readily expel or reduce the oxids. Before "tapping" the steel into a ladle or other vessel, I contend it is advisable and convenient—in fact essential—to add about five and one-half per cent. of ferro-manganese in the furnace, thereby increasing the temperature and clearing the "slag". The addition of five and one-half percent. of ferro-manganese to the furnace is insufficient to kill the steel or in other words to convert the oxids by the amount of carbon which the ferro-manganese contains but is ample for the purpose for which it is intended, *i. e.* for the purpose of raising the temperature of the metal prior to "tapping" and also clearing the "slag". The remaining portion of the ferro-manganese to bring up the requisite percentage is melted in a crucible furnace, either of the ordinary type, or better by a blast or wind blown crucible furnace, such as, what is well known in the trade as the "Bauman" or "Morgan" tilting furnaces.

The molten ferro-manganese is run into a ladle (which for distinction I will call No. 1) which has been previously heated to prevent "chilling", after which the steel overcharged with oxids which has previously been "tapped" into another ladle (I will call No. 2) is, while in a molten state, run into ladle No. 1, and will alloy with the ferro-manganese and form a resultant metal up to the mixture or quality desired and will then be manganese steel: The residue steel in the ladle No. 2 being capable of being used as ordinary steel when properly treated—if desired this manganese steel may be manipulated with one ladle direct from the furnace—in which case the ferro-manganese is put into the ladle prior to the molten steel overcharged with oxids being run into the said ladle. By so manufacturing or manipulating the beforementioned steel it will then be possible to roll, forge, smith or cast into any desired or required form or section, and the steel will be suitable for the manufacture of armor plates, gun-forgings, projectiles, trainway-rails, points and crossings, dredger work and others requiring hard wearing material, and owing to being non-magnetic or feebly magnetic it is suitable for electrical purposes.

Having now particularly described and ascertained the nature of my said invention and in what manner the same is to be performed, I declare that I make no claim to the hereinbefore described process except when a mild—that is to say, a low carbon steel is used which is overcharged with oxids and a small percentage of ferro-manganese is added in the furnace as described.

What I claim is—

A method of manufacturing a high percent. manganese steel which consists in treating a mild or low carbon steel overcharged with oxid while in the furnace to ferro-manganese, and then admixing therewith molten rich ferro-manganese, after tapping.

In testimony whereof I have hereunto set my hand in presence of two subscribing witnesses.

CHARLES HENRY KELSALL.

Witnesses:
    EDMUND CHADWICK,
    JAS. STEWART BROADFOOT.